United States Patent
Clevorn (10) Patent No.: US 8,873,665 B2
(45) Date of Patent: Oct. 28, 2014

(54) COMMUNICATION DEVICES AND METHODS FOR RECEIVING DATA

(71) Applicant: Intel Mobile Communications GmbH, Neubiberg (DE)

(72) Inventor: Thorsten Clevorn, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/682,758

(22) Filed: Nov. 21, 2012

(65) Prior Publication Data
US 2014/0140424 A1    May 22, 2014

(51) Int. Cl.
*H04B 7/02*    (2006.01)
*H04B 7/04*    (2006.01)

(52) U.S. Cl.
CPC ................................. *H04B 7/0417* (2013.01)
USPC .......................... 375/267; 375/285; 455/522

(58) Field of Classification Search
CPC ..... H04L 1/06; H04L 1/0618; H04L 27/2647; H04B 7/0417; H04B 7/0669
See application file for complete search history.

(56) References Cited

U.S. PATENT DOCUMENTS

| | | | |
|---|---|---|---|
| 2011/0255629 A1* | 10/2011 | Ko et al. | 375/285 |
| 2012/0002661 A1* | 1/2012 | Nishimoto et al. | 370/345 |
| 2012/0149424 A1 | 6/2012 | Dawid et al. | |
| 2012/0269282 A1* | 10/2012 | Jin et al. | 375/267 |
| 2012/0288024 A1* | 11/2012 | Hansen et al. | 375/267 |
| 2012/0314649 A1* | 12/2012 | Forenza et al. | 370/328 |
| 2013/0072189 A1* | 3/2013 | Cheng et al. | 455/436 |
| 2013/0267181 A1* | 10/2013 | Ayatollahi et al. | 455/73 |

OTHER PUBLICATIONS

3GPP TS 36.213 V11.0.0 (Sep. 2012) 3rd Generation Partnership Project; Technical Specification Group Radio Access Network; Evolved Universal Terrestrial Radio Access (E-UTRA); Physical layer procedures (Release 11); pp. 1-143.

* cited by examiner

*Primary Examiner* — Leon-Viet Nguyen (57) ABSTRACT

A communication device is provided comprising a plurality of receive antennas; a determiner configured to determine, for each receive antenna of the plurality of receive antennas, whether the receive antenna is to be used by the communication device for performing a MIMO data reception; and a receiver configured to perform the MIMO data reception using the receive antennas that have been determined to be used for performing the MIMO data reception.

23 Claims, 9 Drawing Sheets

COMMUNICATION DEVICES AND METHODS FOR RECEIVING DATA

TECHNICAL FIELD

The present disclosure relates to communication devices and methods for receiving data.

BACKGROUND

A communication device, such as a mobile terminal of a cellular mobile communication system, may include a plurality of receive antennas. While using a higher number of antennas allows better reception quality and higher throughput it typically also leads to an increased power consumption of the communication device. Thus, approaches for the efficient usage of a plurality of receive antennas in a communication device are desirable.

SUMMARY

A communication device is provided including a plurality of receive antennas; a determiner configured to determine, for each receive antenna of the plurality of receive antennas, whether the receive antenna is to be used by the communication device for performing a MIMO data reception; and a receiver configured to perform the MIMO data reception using the receive antennas that have been determined to be used for performing the MIMO data reception.

Further, a communication device is provided including a plurality of receive antennas; a determiner configured to determine a type of a communication service used by the communication device and to determine, based on the type of the communication service, for each receive antenna of the plurality of receive antennas, whether the receive antenna is to be used by the communication device for performing a data reception; and a receiver configured to perform the data reception using the receive antennas that have been determined to be used for performing the data reception.

Additionally, methods for receiving data according to the above communication devices are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

3GPP (3rd Generation Partnership Project) has introduced LTE (Long Term Evolution) into the Release 8 version of UMTS (Universal Mobile Telecommunications System) standards.

The air interface of an LTE communication system is called E-UTRA (Evolved Universal Terrestrial Radio Access) and is commonly referred to as '3.9G'. In December 2010, the ITU recognized that current versions of LTE and other evolved 3G technologies that do not fulfill "IMT-Advanced" requirements could nevertheless be considered '4G', provided they represent forerunners to IMT-Advanced and "a substantial level of improvement in performance and capabilities with respect to the initial third generation systems deployed already. LTE is therefore sometime also referred to as '4G' (mainly for marketing reasons).

In comparison with its predecessor UMTS, LTE offers an air interface that has been further optimized for packet data transmission by improving the system capacity and the spectral efficiency. Among other enhancements, the maximum net transmission rate has been increased significantly, namely to 300 Mbps in the downlink transmission direction and to 75 Mbps in the uplink transmission direction. LTE supports scalable bandwidths of from 1.4 MHz to 20 MHz and is based on new multiple access methods, such as OFDMA (Orthogonal Frequency Division Multiple Access)/TDMA (Time Division Multiple Access) in downlink direction (tower, i.e. base station, to handset, i.e. mobile terminal) and SC-FDMA (Single Carrier-Frequency Division Multiple Access)/TDMA in uplink direction (handset to tower). OFDMA/TDMA is a multicarrier multiple access method in which a subscriber (i.e. a mobile terminal) is provided with a defined number of subcarriers in the frequency spectrum and a defined transmission time for the purpose of data transmission. The RF (Radio Frequency) capability of a mobile terminal according to LTE (also referred to as User Equipment (UE), e.g. a cell phone) for transmission and reception has been set to 20 MHz. A physical resource block (PRB) is the baseline unit of allocation for the physical channels defined in LTE. It includes a matrix of 12 subcarriers by 6 or 7 OFDMA/SC-FDMA symbols. At the physical layer a pair of one OFDMA/SC-FDMA symbol and one subcarrier is denoted as a 'resource element'. A communication system that may for example be a communication system according to LTE is described in the following with reference to FIG. 1.

Figure 1:
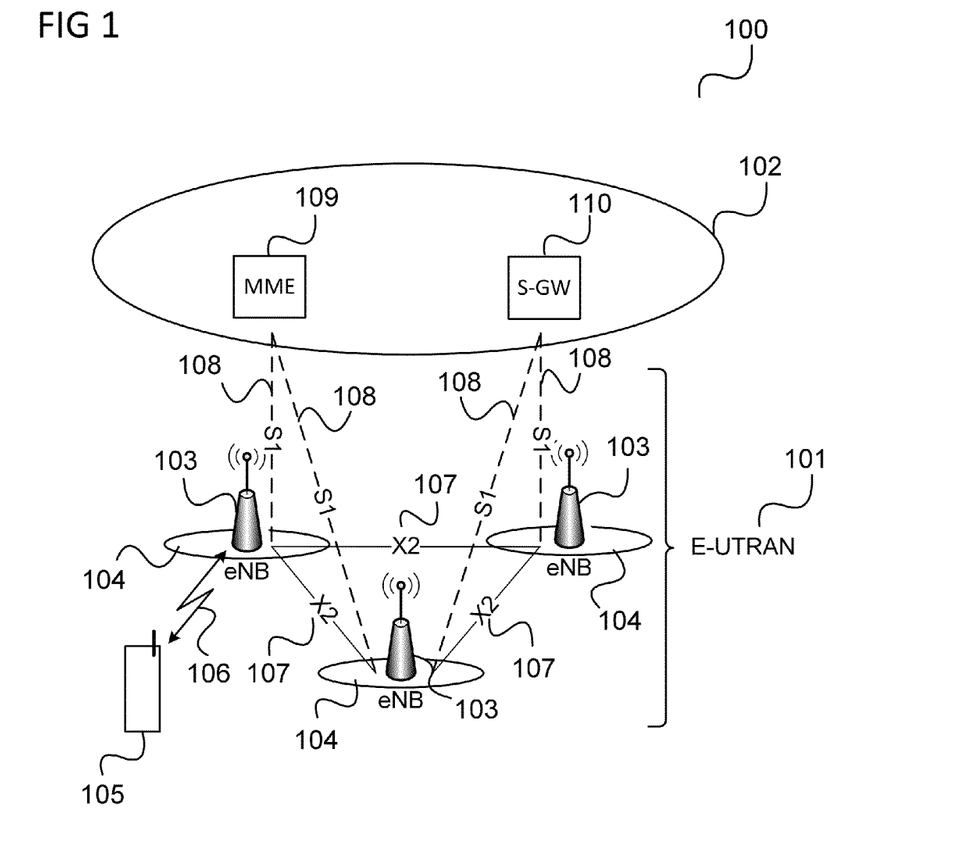
FIG. 1 shows a communication system.

FIG. 1 shows a communication system 100.

The communication system 100 is a mobile communication network, e.g. a cellular mobile communication system (also referred to as cellular radio communication network in the following), including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment) 105 located in a mobile radio cell 104 may communicate with the core network 102 and with other mobile terminals 105 via the base station providing coverage in (in other words operating) the mobile radio cell. In other words, the base station 103 operating the mobile radio cell 104 in which the mobile terminal 105 is located provides the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110 and the base stations 103, i.e. a base station 103 can be connected to more than one MME/S-GW 109, 110 and an MME/S-GW can 109, 110 be connected to more than one base station 103. This enables network sharing in LTE.

For example, the MME 109 may be responsible for controlling the mobility of mobile terminals located in the coverage area of E-UTRAN, while the S-GW 110 is responsible for handling the transmission of user data between mobile terminals 105 and core network 102.

In case of LTE, the radio access network 101, i.e. the E-UTRAN 101 in case of LTE, can be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:
Functions for Radio Resource Management: Radio Bearer Control, Radio Admission Control, Connection Mobility Control, dynamic allocation of resources to UEs 105 in both uplink and downlink (scheduling);
IP header compression and encryption of user data stream;
Selection of an MME 109 at UE 105 attachment when no routing to an MME 109 can be determined from the information provided by the UE 105;
Routing of User Plane data towards Serving Gateway (S-GW) 110;
Scheduling and transmission of paging messages (originated from the MME);
Scheduling and transmission of broadcast information (originated from the MME 109 or O&M (Operation and Maintenance));
Measurement and measurement reporting configuration for mobility and scheduling;
Scheduling and transmission of PWS (Public Warning System, which includes ETWS (Earthquake and Tsunami Warning System) and CMAS (Commercial Mobile Alert System)) messages (originated from the MME 109);
CSG (Closed Subscriber Group) handling.

Each base station of the communication system 100 controls communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located (and on which it is camping). If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

The mobile terminal 105 may have multiple receive antennas, e.g. for receive diversity (RxDiv) or MIMO (Multiple Input Multiple Output) schemes. According to LTE, two receive antennas are assumed as mandatory. Multiple receive antennas may be used improve the demodulation performance which allows more robustness and higher throughput.

However, the power consumption of the mobile terminal 105 increases with each additional antenna. Thus, if the conditions are good and the throughput is low, fewer antennas than the available antennas may be sufficient for the required robustness and throughput. The use of a higher number of antennas than the required number of antennas may then generate unnecessary power consumption.

Accordingly, some antennas may be switched off if they are not needed. This is called dynamic receive diversity (dynamic RxDiv). For example, for 3G DPCH/Rel99, where there is a dedicated and power controlled channel for the UE, the SNR (Signal-to-Noise Ratio) of the dedicated channel may be compared with a target SNR for controlling dynamic RxDiv. For a shared channel like according to HSDPA (High Speed Data Packet Access), where the throughput is the key target, RxDiv may be kept on (i.e. a higher number of antennas may be used) as long as packets are received on the shared channel and switched off (i.e. a lower number of antennas is used) if no packets are received.

These approaches can be seen to focus on systems (e.g. 3G) in which a single antenna is a well known operation point.

In the following, an approach is described in which, as e.g. in LTE or MIMO-HSDPA, multiple antennas are present at the receiver side.

Figure 2:
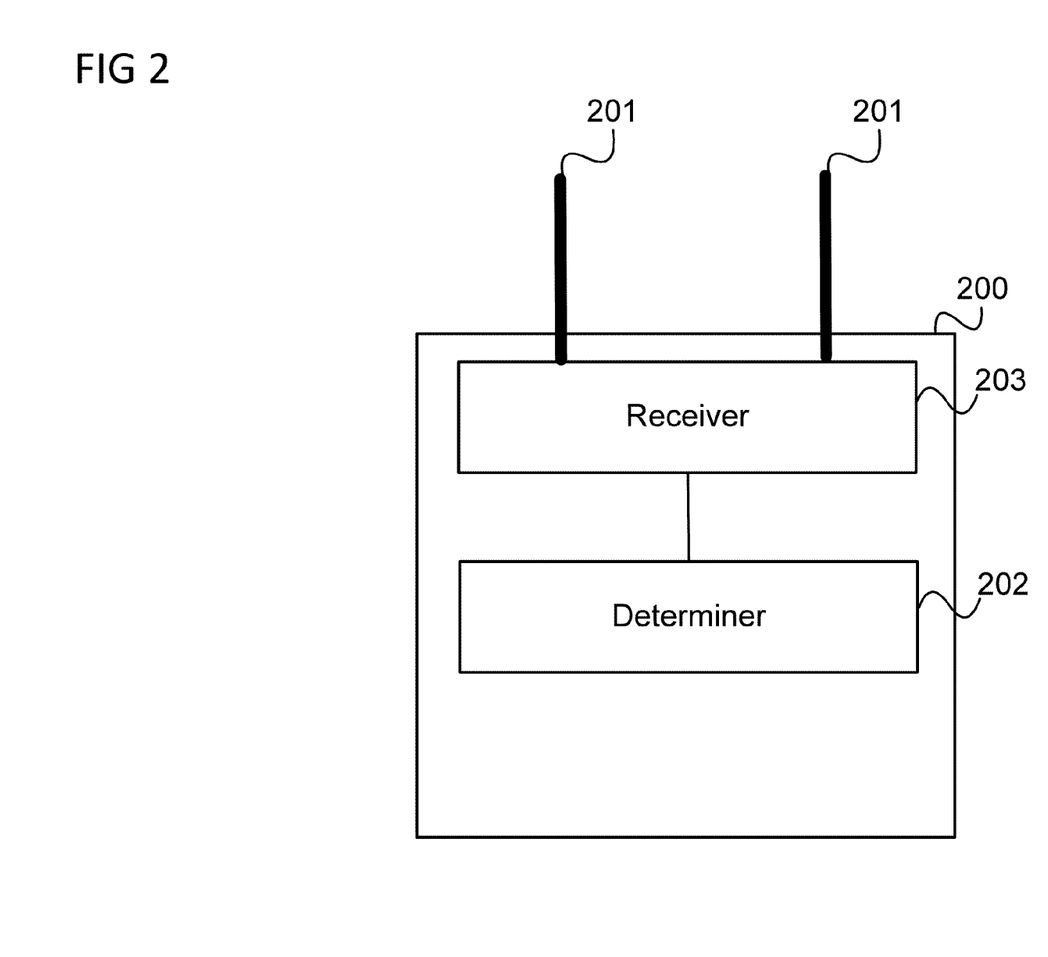
FIG. 2 shows a communication device determining antennas to be used for MIMO data reception.

FIG. 2 shows a communication device 200.

The communication device 200 includes a plurality of receive antennas 201.

Further, the communication device 200 includes a determiner 202 configured to determine, for each receive antenna of the plurality of receive antennas 201, whether the receive antenna is to be used by the communication device for performing a MIMO data reception.

The communication device 200 further includes a receiver 203 configured to perform the MIMO data reception using the receive antennas that have been determined to be used for performing the MIMO data reception.

In other words, for example, a communication device determines which of its receive antennas are to be used for a MIMO data reception. The communication device may for example increase or decrease the number of receive antennas used for a previous MIMO data reception.

For example, a mobile terminal (e.g. a UE according to LTE) having a plurality of receive antennas may dynamically switch on/off antennas using e.g. LTE with receive diversity and MIMO. A certain NodeB behavior regarding the number of transmitted MIMO streams (to allow switching off one or more receive antennas) may for example be triggered using adapted rank reporting. The switching on/off of antennas may be based on various measurement schemes and various decision criteria.

The MIMO data reception is for example a MIMO data reception from a sender of MIMO streams and the communication device for example further includes a transmitter configured to transmit an indication of a number of MIMO streams that should be transmitted by the sender to the communication device, wherein the indication indicates a number of MIMO streams that is equal to the number of receive antennas that have been determined to be used for performing the MIMO data reception. By MIMO streams it is for example referred to the individual data streams which are generated at an MIMO transmitter for a MIMO transmission with techniques like e.g. spatial multiplexing and precoding. Despite being transmitted in parallel on the same radio channel resource the MIMO receiver can separate these MIMO streams and thus increase the total transmitted data rate.

For example the indication of the number of MIMO streams that should be transmitted by the sender to the communication device is an indication of the number of MIMO streams that can be successfully received by the communication device.

The indication is for example a MIMO rank indicator.

The determiner may for example be configured to determine a number of receive antennas to be used by the communication device for performing the MIMO data reception and is configured to determine for as many of the receive antennas that they are to be used for performing the MIMO data reception as given by the number. In other words, the determiner determines the number of antennas to be used for the MIMO data reception and selects a corresponding number of antennas from the plurality of antennas.

The determiner may for example be configured to determine for each receive antenna of the plurality of receive antennas, whether the receive antenna is to be used by the communication device for performing a MIMO data reception based on a reception performance criterion.

For example, the determiner is configured to determine for each receive antenna of the plurality of receive antennas, whether the receive antenna is to be used by the communication device for performing a MIMO data reception such that the number of the receive antennas for which it determines that that they are to be used for performing the MIMO data reception is the number minimum of antennas to meet the reception performance criterion. In other words, the determiner chooses a minimum subset of the antennas that meets the reception performance criterion.

The reception performance criterion is for example a required throughput of the MIMO data reception. The reception performance criterion may also be a required robustness of the MIMO data reception or a combination of both.

The determiner may be configured to determine, for each antenna of the plurality of antennas, a reception performance and is for example configured to determine whether the receive antenna is to be used by the communication device for performing a MIMO data reception based on the reception performance.

For example, the determiner is configured to determine, for each antenna of the plurality of antennas, whether the antenna is to be used by the communication device for performing a MIMO data reception based on a comparison of the reception performances determined for the receive antennas.

The determiner is for example configured to determine, for each receive antenna of the plurality of receive antennas, whether the receive antenna is to be used by the communication device for performing a MIMO data reception based on whether the receive antenna is used by the communication device for sending data.

The determiner may be configured to determine, for each receive antenna of the plurality of receive antennas, whether the receive antenna is to be used by the communication device for performing a MIMO data reception based on the radio conditions between the communication device and a sender of the data to be received in the MIMO data reception.

The determiner may be configured to determine, for each receive antenna of the plurality of receive antennas, whether the receive antenna is to be used by the communication device for performing a MIMO data reception based on a correlation of the antenna with other antennas of the plurality of receive antennas.

The determiner may for example be configured to determine, for each receive antenna of the plurality of receive antennas, whether the receive antenna is to be used by the communication device for performing a MIMO data reception based on a reception quality of a previous MIMO data reception performed using at least a part of the plurality of receive antennas.

For example, the determiner is configured to determine, for each receive antenna of the plurality of receive antennas, whether the receive antenna is to be used by the communication device for performing a MIMO data reception such that the number of receive antennas that have been determined to be used for performing the MIMO data reception is higher than the number of receive antennas used for the previous MIMO data reception if the reception quality of the previous MIMO data reception is not sufficient for the MIMO data reception.

For example, the determiner is configured to determine, for each receive antenna of the plurality of receive antennas, whether the receive antenna is to be used by the communication device for performing a MIMO data reception such that the number of receive antennas that have been determined to be used for performing the MIMO data reception is lower than the number of receive antennas used for the previous MIMO data reception if the MIMO streams to be received in the MIMO data reception is lower than the number of receive antennas used in the previous MIMO data reception.

The communication device is for example a mobile terminal.

The receiver is for example configured to receive data from a base station in the MIMO data reception.

Figure 3:
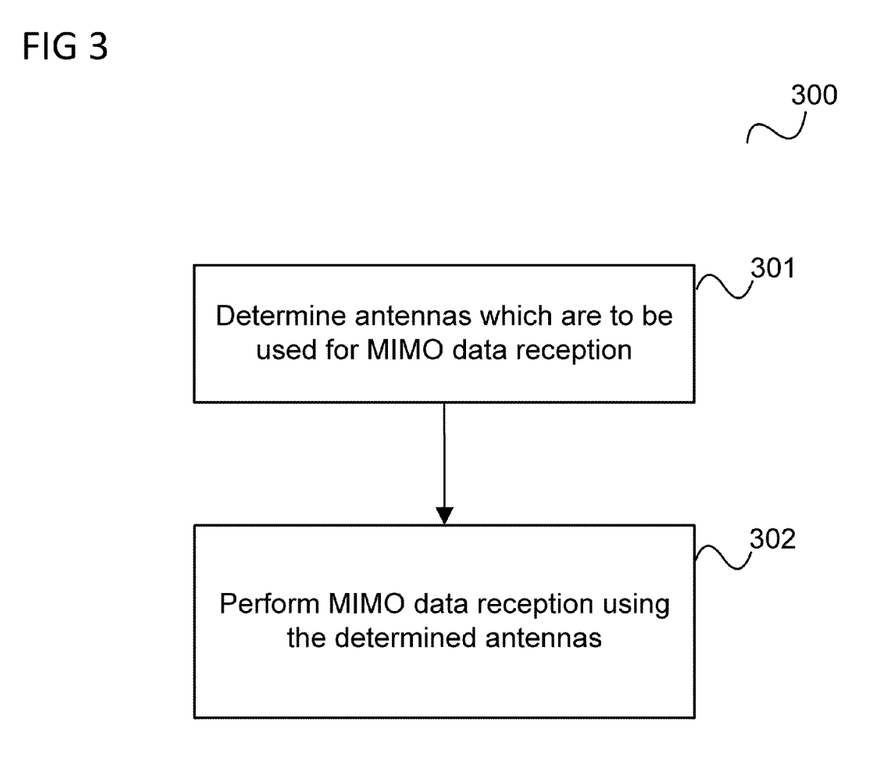
FIG. 3 shows a flow diagram illustrating a method for MIMO data reception.

The mobile terminal may for example carry out a method as illustrated in FIG. 3.

FIG. 3 shows a flow diagram 300.

The flow diagram 300 illustrates a method for receiving data.

In 301, a communication device determines, for each receive antenna of a plurality of receive antennas of the communication device, whether the receive antenna is to be used by the communication device for performing a MIMO data reception.

In 302, the communication device performs the MIMO data reception using the receive antennas that have been determined to be used for performing the MIMO data reception.

A further example for a communication device that may be provided is described in the following.

Figure 4:
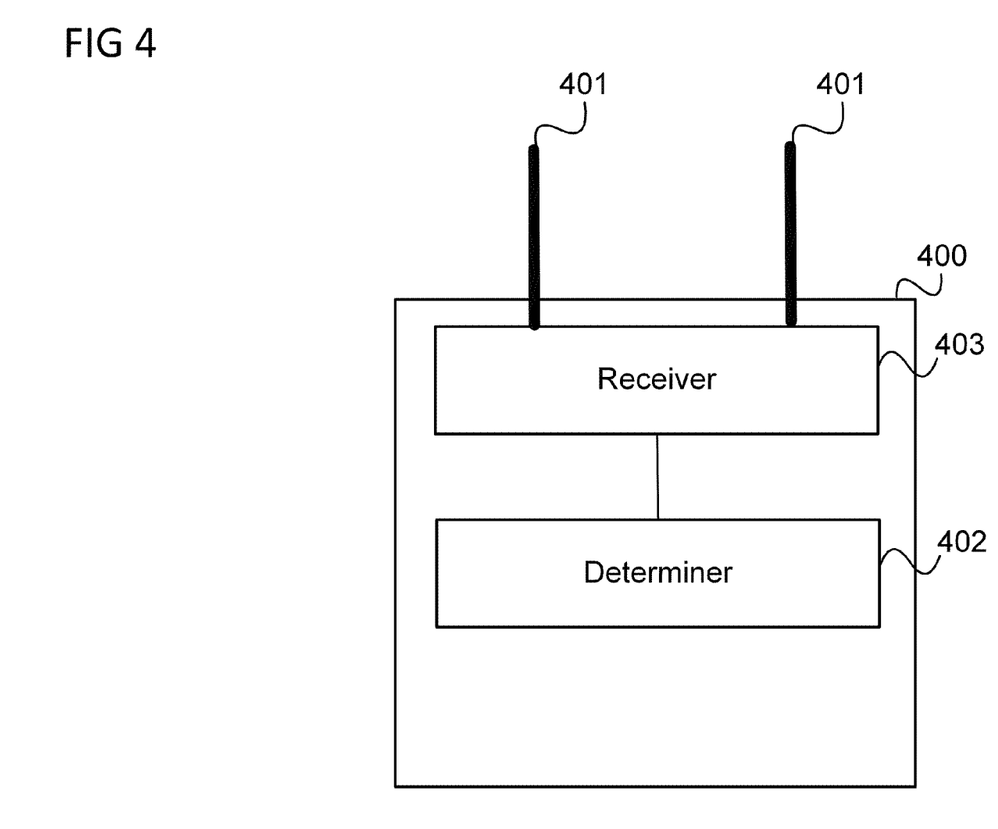
FIG. 4 shows a communication device determining receive antennas based on a communication service type.

FIG. 4 shows a communication device 400.

The communication device 400 includes a plurality of receive antennas 401.

Further, the communication device 400 includes a determiner 402 configured to determine a type of a communication service used by the communication device 400 and to determine, based on the type of the communication service, for each receive antenna of the plurality of receive antennas 401, whether the receive antenna is to be used by the communication device 400 for performing a data reception.

The communication device 400 further includes a receiver 402 configured to perform the data reception using the receive antennas that have been determined to be used for performing the data reception.

In other words, for example, a communication device determines which (and thus how many) receive antennas to use for a data reception based on a communication service type. For example, if the communication service is of the type that data needs to be continuously transmitted, such as a voice call, a single antenna may be determined to be used since even if a higher number of antennas is used, the overall transmission cannot be ended earlier. As a further example, if the communication service is of the type that it sends a burst of data on a periodic basis and according to the periodicity, a burst is expected, the determiner may determine a high number of antennas to be used for the reception of data.

The type of the communication service is for example a type of the transmission behavior of the communication service.

The type of the communication service may for example be whether the communication service requires periodic reception of data, real-time reception of data or burst reception of data.

The type of the communication service is for example whether the communication service can be completed earlier if a higher data throughput is supported.

The type of the communication service is for example a data throughput requirement of the communication service.

Figure 5:
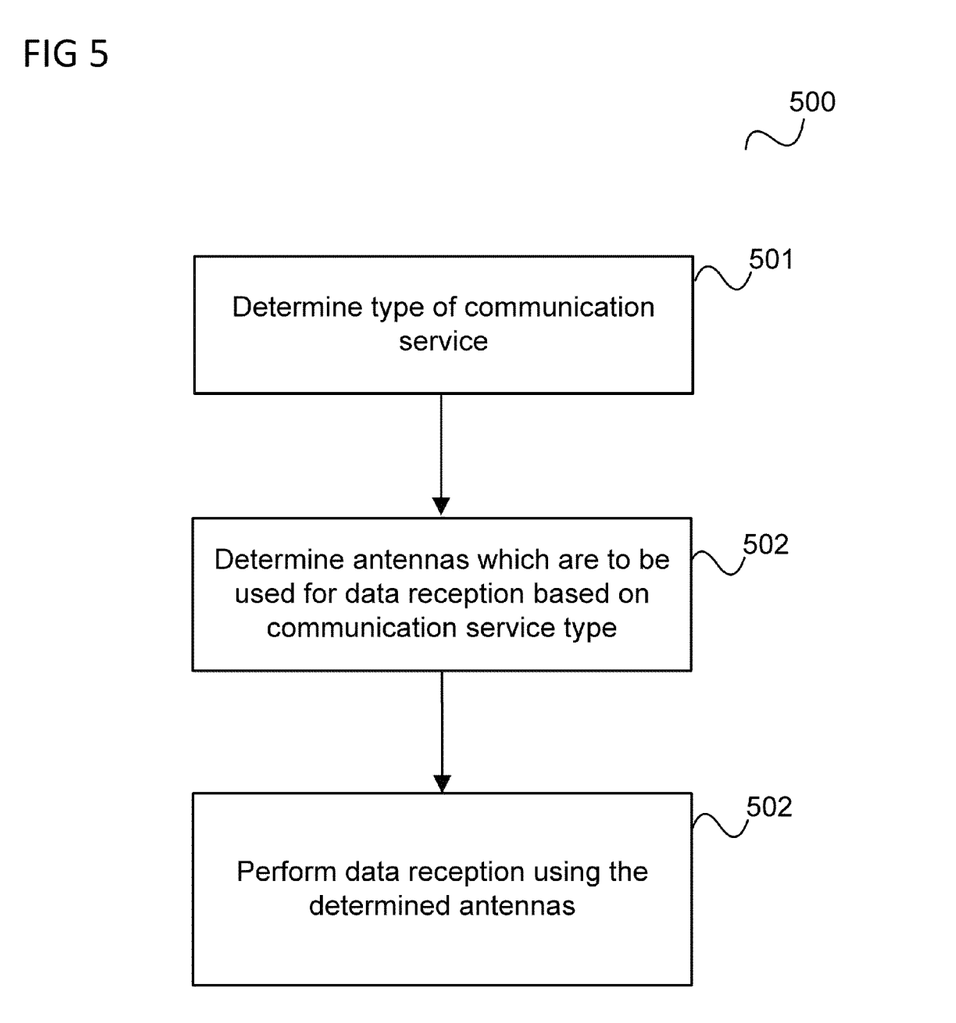
FIG. 5 shows a flow diagram illustrating a method for data reception.

The communication device 400 for example carries out a method as illustrated in FIG. 5.

FIG. 5 shows a flow diagram 500.

The flow diagram 500 illustrates a method for receiving data.

In 501, a communication device determines a type of a communication service used by the communication device.

In 502, the communication device determines, based on the type of the communication service, for each receive antenna of a plurality of receive antennas of the communication device, whether the receive antenna is to be used by the communication device for performing a data reception.

In 503, the communication device performs the data reception using the receive antennas that have been determined to be used for performing the data reception.

It should be noted that aspects and examples described in context of the communication device 200 are analogously valid for the communication device 400 and the methods illustrated in FIGS. 3 and 5 and vice versa.

The components of the communication devices (e.g. determiner, transmitter etc.) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

In the following, examples are described in which the communication device 200 and the communication device 400, respectively, correspond to an LTE mobile terminal such as the mobile terminal 105 of FIG. 1, in the following referred to as UE (user equipment).

Regarding the following examples, a differentiation is made between different receiver configurations scenarios, e.g. in terms of transmission modes (TM) in LTE.

Examples Related to "Simple" Receive Diversity, i.e. with a Single Input Data Stream, as e.g. in TM1, TM2, TM7 According to LTE For the UE 105 the transmission modes TM1, TM2, and TM7 mean just classic receive diversity (like in 3G), where the signals of the multiple antennas are combined and no special processing (such as in MIMO) is needed and no feedback to the NodeB 103 (such as Rank Indicator (RI), Precoding Matrix Indicator (PMI)) for the received signals is provided. The NodeB 103 may apply some transmit diversity (TM2) or beam-forming (TM7) schemes, but these are transparent in terms of UE receive diversity.

In such a scenario, mainly the principles for 3G may be applied for example. An LTE communication is packet switched and uses a shared channel. This is similar to HSDPA. Thus, one approach is for example to switch RxDiv on (i.e. use a plurality of antennas, or, more generally, a higher number of antennas) when data is received and switch RxDiv off (i.e. use only one antenna, or, more generally, a lower number of antennas) if no data is received anymore. There may be some hysteresis for switching RxDiv off, e.g. only if no data is received anymore for a certain number of slots RxDiv is switched off.

If very fast switching of RxDiv is possible then one can rely only on the common control channel PDCCH at the beginning of a subframe which indicates if data for the UE 105 is transmitted on the shared data channel PDSCH in the remainder of the subframe. Assuming good conditions and currently no scheduled traffic for the UE 105, RxDiv may be switched off since under good receive conditions the PDDCH can typically be received with single-RX (i.e. using a single antenna), since the PDCCH is a common channel which also needs to be received by cell edge users.

The UE may further monitor the PDCCH quality, e.g. the PDCCH SNR or CRC errors, to decide whether the PDCCH needs to be read with RxDiv on to ensure reliable detection. If bad receive conditions are detected, e.g. if the PDCCH SNR is below a threshold or there is a recent CRC error, then the PDCCH may be read with RxDiv on until the conditions get good again.

Figure 6:
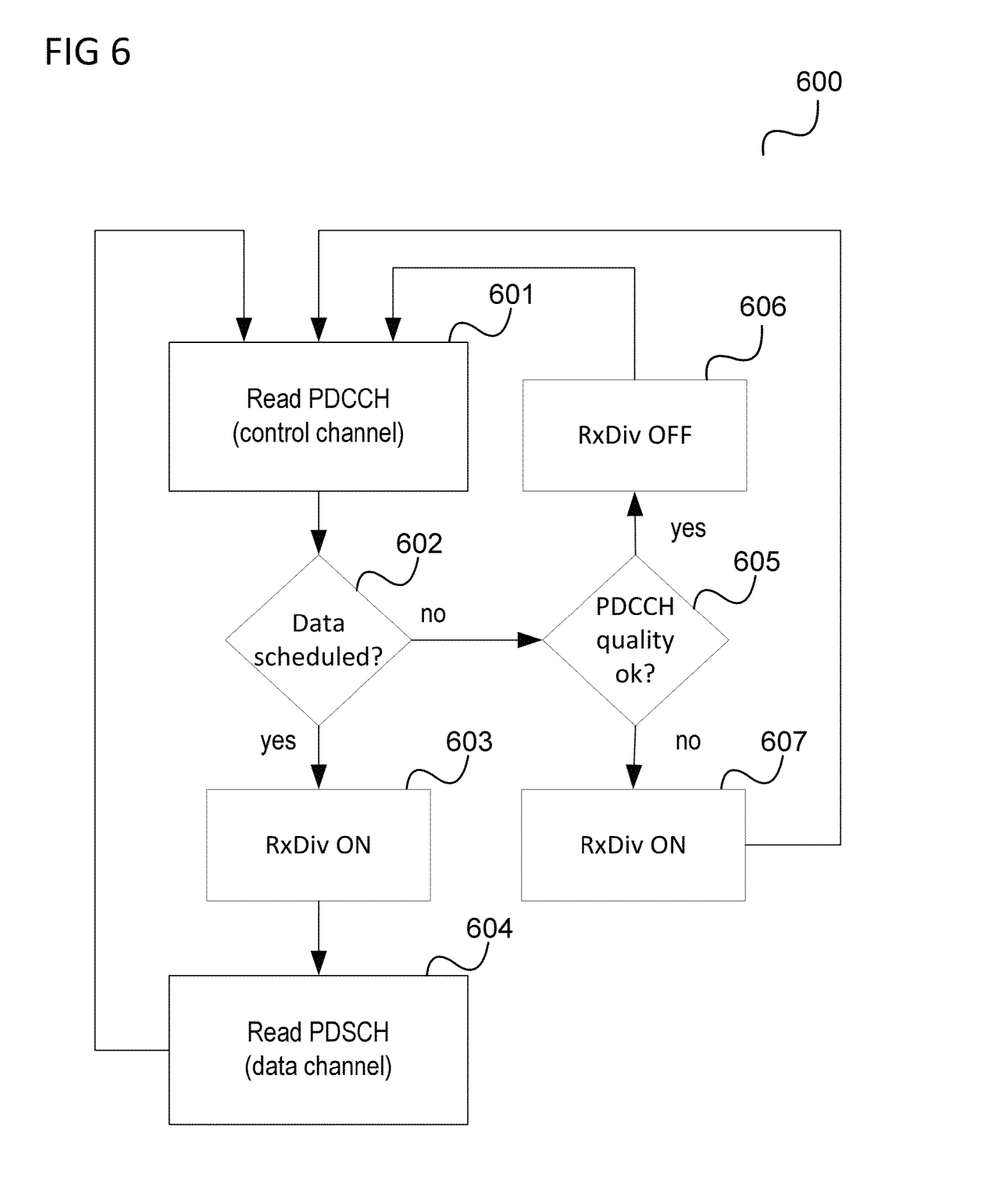
FIG. 6 shows a flow diagram illustrating an antenna selection scheme for PDCCH reception.

This approach is illustrated in FIG. 6.

FIG. 6 shows a flow diagram 600.

In 601, the UE 105 reads the PDCCH.

In 602, the UE 105 determines whether downlink data is scheduled for the UE 105 based on the reading of the PDCCH. In case that downlink data (i.e. a downlink data transmission) is scheduled for the UE 105, the UE switches RxDiv on in 603 and reads data on the PDSCH in 604. After the UE again reads the PDCCH in 601.

In case that no downlink data is scheduled for the UE 105, the UE 105 in 605 determines whether the PDCCH quality is sufficient to read it with RxDiv off. If the PDCCH quality is sufficient, the UE 105 turns RxDiv off in 606 and continues to read the PDCCH in 601. If the PDCCH quality is not sufficient, the UE 105 turns RxDiv on in 606 and again reads the PDCCH in 601.

For determining whether the PDCCH quality is sufficient, the UE 105 may for example determine the SNR of the PDCCH using known reference symbols and applying a respective offset.

For example, if the UE 105 demodulates the PDSCH in the second part of a subframe with RxDiv on, the UE 105 may demodulate the PDCCH at the beginning of the following subframe also with RxDiv on and if there is no UE data indicated in this PDCCH, RxDiv may be switched off (according to 602 and 603).

The possible speed of switching RxDiv on/off may influence whether the PDSCH transmission belonging to a PDCCH transmission (i.e. being indicated by the PDCCH transmission) is following the RxDiv decision (e.g. based on whether UE downlink data is scheduled) of that PDCCH transmission, or whether the RxDiv decision is only applied for the following PDSCH transmission (or PDCCH transmission), i.e. the PDSCH (or PDCCH) transmission of the next subframe. This may depend also on the position of the UE specific part in the PDCCH transmission. For example, in case that the UE specific part is at the beginning of the PDCCH transmission (i.e. at the beginning of the transmission period allocated for the PDCCH transmission) there may enough time to switch RxDiv ON for the start of the following PDSCH (i.e. the PDSCH transmission in the same subframe). On the other hand, in case that the UE specific part is near the end of the PDCCH transmission it may be too late for the first PDSCH symbol and the UE 105 may only switch RxDiv on during the PDSCH transmission or for the following PDSCH transmission (i.e. the PDSCH transmission of the next subframe).

A further example, which may be seen to correspond to the communication device 400 and the method illustrated in FIG. 5 may be seen based on the fact that, for example, a file download with RxDiv on may typically be beneficial, because the faster download saves more energy than the activation of RxDiv, while for a streaming scenario this may be different, especially when the RxDiv on/off cannot be done quickly, e.g. on a time slot by time slot basis.

For example, in case of Voice over LTE (VoLTE) a low rate voice stream is transmitted continuously and the end is determined by the user and not by the speed of the transmission. Thus, here RxDiv may be switched off in good radio conditions which may for example be determined by the PDCCH and PDCCH quality (determined by signal levels, SNRs, CRC errors, . . . ) to save power and RxDiv is for example only switched on in bad radio conditions or when not only a streaming service is active, but e.g. a file download is carried out in parallel.

Figure 7:
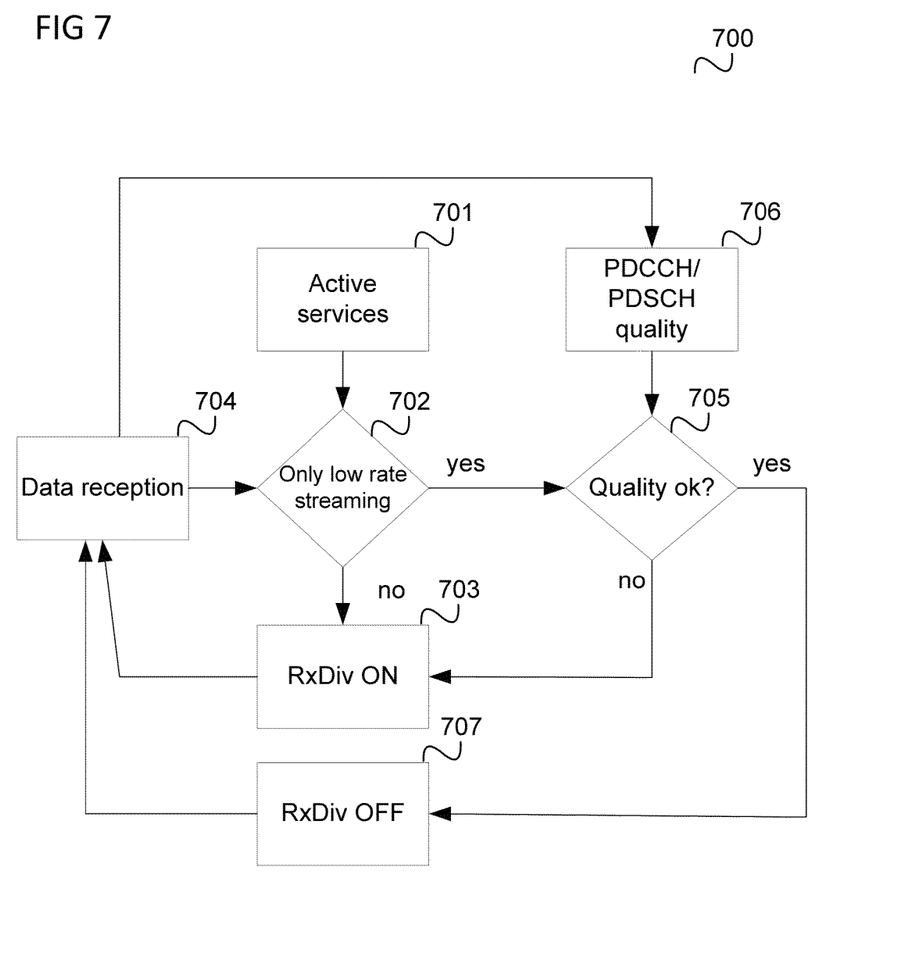
FIG. 7 shows a flow diagram illustrating an antenna selection scheme based on communication service type.

This approach is illustrated in FIG. 7.

FIG. 7 shows a flow diagram 700.

In 701, the UE 105 determines which communication services are active, i.e. which communication services are currently used by the UE 105.

In 702, the UE 105 determines whether only low rate streaming communication services are currently used by the UE 105. If this is not the case, the UE switches on RxDiv in 703 and performs (or continues) data reception in 704. If only low rate streaming communication services are currently used by the UE 105 the UE 105 determines in 705, based on a determination of PDCCH/PDSCH reception quality in 706, whether the reception quality of these channels is sufficient (e.g. whether these channels can be received with an acceptable SNR with RxDiv being off). If the quality is sufficient, RxDiv is switched (or kept) off in 707 and data reception is carried out (or continued) in 704 with RxDiv being off. If the quality is not sufficient, RxDiv is switched on in 703 and data reception is carried out in 704 with RxDiv being on. Based on the data reception, PDCCH/PDSCH reception quality may be determined in 706 to be used in the following decision in 705, e.g. for the next subframe.

When there are also UE specific reference symbols available in the UE 105, like in TM7 of LTE, these may be used for computation of a signal level or an SNR, e.g. of the PDSCH, which can be considered in the RxDiv decision.

When DRX cycles are configured, typically no data is expected, because otherwise there would be no DRX cycles started. Thus, the default option may be RxDiv on. Only when the quality of the control channel, e.g. the PDCCH degrades such that RxDiv is needed for reliable decoding (determined e.g. by signal levels, SNRs, CRC errors), RxDiv may be switched on.

In certain cases the UE 105 may know when data can be expected at the end of a DRX cycle, e.g. depending on the type of communication service. In this case, it may switch on RxDiv proactively to improve reception and allow for a robust start of the reception. For example if the UE 105 checks every 60 seconds for emails (i.e. the communication service is a regular checking for emails), it knows that after DRX of 60 seconds some (email control) data is received. In the time between the 60 seconds other non-regular data traffic may arrive, but this cannot be planned and for this, the scheme as described in FIG. 7 may be applied. There may be also other indicators for incoming data traffic during a DRX cycle, e.g. an indicator from the application processor or a transmission (or the preparation of a transmission, e.g. a full buffer) in the uplink.

Examples Related to "Advanced" Receive Diversity, i.e. with Multiple Input Data Streams and Multiple Output Data Streams (MIMO), as e.g. in TM3 and TM4 According to LTE For LTE, there exists also transmission modes (TMs) in which "advanced" spatial multiplexing schemes, i.e. MIMO schemes, are applied when multiple antennas are available. It should be noted that MIMO is also specified for HSDPA and the approaches described in the following may also be applied to HSDPA MIMO or other MIMO transmission standards. In the case of data transmission using MIMO according to LTE, the UE 105 provides feedback to the NodeB 103, e.g. the Rank Indicator (RI) and the Precoding Matrix Indicator (PMI). The rank or the channel coefficient/estimation matrix for examples defines how many different streams can be efficiently received by the UE 105. With the RI report to the NodeB 103 the UE 105 suggests to the NodeB how many different MIMO streams the NodeB 103 shall transmit (in parallel). To receive a number of MIMO streams that are transmitted in parallel, the UE 105 needs at minimum as many receive antennas as there are MIMO streams. The usage of more antennas at the transmitter and the receiver than the number of streams (i.e. the rank of the MIMO transmission)

can improve the demodulation performance (which might not be needed in good conditions) but is not necessary for demultiplexing the MIMO streams.

In the following examples are described in which the number of active receive antennas on the UE side is adapted for a MIMO communication such that for example power is saved in case some receive antennas are not needed. This may be seen to correspond to the communication device 200 and the method illustrated in FIG. 3.

The following examples may for example be applied to a 2×2 MIMO system with two receive antennas on the UE side and two transmit antennas on the NodeB side. However, the schemes may also be extended to a higher number of receive antennas. For example, according to LTE advanced, up to 8×8 MIMO, which means eight receive antennas, is specified. Thus, switching off an antenna may refer to e.g. going from using six to using five receive antennas or switching on may refer to going from using three to using four receive antennas. Further, the "step-size", i.e. the number of antennas switched on or off may be larger than a single antenna.

The approaches described above in context of "simple" receive diversity may also be applied for the "advanced" receive diversity. For example:

Monitoring the control channel (PDCCH) and checking whether data for the UE 105 is transmitted, and switching antennas on/off respectively. With MIMO this can be extended to the detection how many MIMO streams are transmitted, i.e. how many antennas the UE needs at minimum to decode the received data.

Considering the type of data that is transmitted, e.g. if only a low rate streaming service like a VoLTE voice call is active, a high MIMO scheme with lots of receive antennas might be unnecessary.

Regarding the switching off of one or more receive antennas it should be noted that according to LTE, as the number of the MIMO streams transmitted to the UE 105 is controlled by the NodeB 103, the UE 105 cannot simply switch antennas off without negotiation with the NodeB 103 since the remaining number of active receive antennas may not be sufficient for receiving the number of MIMO streams and thus the UE 105 should at least maintain as many active receive antennas as given by the rank it reports with the rank indicator (RI).

To reduce the number of active antennas (i.e. switch off one or more antennas, i.e. use reduce the number of antennas used for the MIMO reception), the UE 105 may in case of good radio conditions and high data rate reception but low rank reduce the number of antennas to the rank it reports with the rank indicator. In the case of only low data rate reception in good conditions and a high rank, the UE 105 may report a lower rank than the one it actually experiences, e.g. rank 1 instead of rank 2, to reduce the number of MIMO streams transmitted by the NodeB 103 which then enables the UE 105 to switch off antennas.

In this scheme, the round trip time of rank reporting by the UE 105 and the corresponding MIMO stream transmission control by the NodeB 103 may be considered. For example, when the UE 105 reduces the reported rank to reduce the number of antennas, the UE 105 only reduces the number of antennas when the NodeB 103 reacts to the reduced rank, i.e. reduces the number of transmitted MIMO streams.

Further, when switching off antennas the UE 105 may try to select the antenna(s) for switching off which have the least contribution to reception performance. This may allow optimizing performance as only the better antenna(s) (i.e. with the highest contribution to reception performance) remain. Exemplary mechanisms for selecting the antenna(s) are:

Based on the channels estimates the UE 105 may compute the individual SNRs (or signal levels) per antenna, sort these SNRs and switch off the antenna(s) with the lowest SNR.

In MIMO communication the rank and the correlation between antennas may actually be more important than the SNR. Thus, based on the channel estimation matrix the UE 105 could eliminate each antenna individually from the matrix, and check for which eliminated antenna the remaining channel matrix projects the best performance and switch off that respective antenna. If more than one antenna is to be switched of a step-wise approach by step-wise eliminating one antenna could be done or a more complex approach where all combinations are considered at once could be done.

When not all receive antennas at the UE 105 are used as transmit antennas as well, this may be taken into account by prioritization or a bias in the evaluation of the performance of the antennas. For example, power saving may be achieved by using the same antenna(s) for reception and transmission. Alternatively, the noise/interference generated by transmission/reception cross-talk may be reduced by using receive antennas which are not used as transmit antennas.

One or more antennas may for example be switched off based on one or a combination of:

Good conditions, e.g.
CQI (Channel Quality Indicator) is above a threshold or CQI is at maximum
No HARQ (Hybrid Automatic Repeat Request) retransmission since a certain number of frames (i.e. always success with the first transmission)
PDCCH or channel estimation data, SNRs, signal levels,
...

...

Measured rank lower than number of active antennas since a certain number of frames (this means that some antennas have a high correlation which blocks a higher number of MIMO streams)

NodeB 103 transmits less MIMO streams than given by the reported rank since a certain number of frames (this means that not enough data is available on the network side for a higher MIMO scheme, e.g. in case of only low rate streaming).

An example for a scheme to switch off antennas is explained in the following with reference to FIG. 8.

Figure 8:
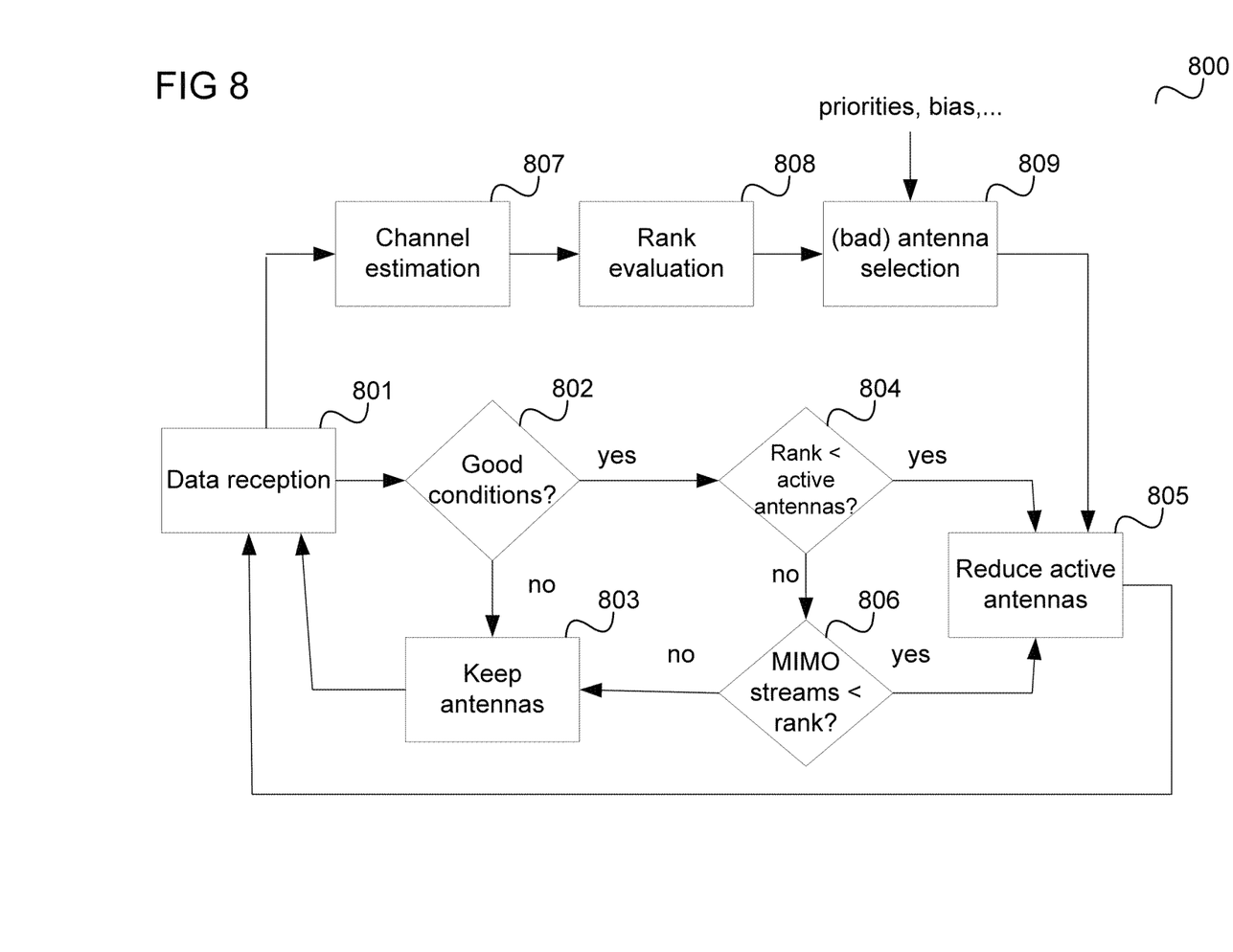
FIG. 8 shows a block diagram illustrating a scheme for removing receive antennas for MIMO data reception.

FIG. 8 shows a block diagram 800.

During data reception in 801, the UE 105 checks in 802 whether the radio conditions are good (e.g. good enough to justify reducing the number of used receive antennas). In case the radio conditions are not good, the UE 105 keeps the number of antennas as they are in 803 and continues data reception in 801.

In case the radio conditions are good, the UE 105 checks in 804 whether the reported rank is lower than the number of active receive antennas. If this is the case, the number of active antennas is reduces in 805. If the rank is not lower than the number of active receive antennas, the UE 105 checks in 806 whether the number of MIMO streams transmitted to the UE 105 is lower than the reported rank. If this is the case, the number of active antennas is reduces in 805. If the number of MIMO streams transmitted to the UE 105 is not lower than the reported rank, the UE 105 keeps the current number of active antennas in 803 and continues with the data reception in 801.

For selection of the antennas to be switched off in case of a reduction of the number of active antennas in 805, the UE 105 performs a channel estimation in 807 based on received data, followed by a rank evaluation in 808 and a selection of antennas to be switched off. After the selected antennas are switched off in 805, the UE 105 continues data reception with the reduced number of active antennas in 801.

Regarding the switching on of antennas, one or more antennas may for example be switched on based on one or a combination of the following:

Bad conditions, identified e.g. by CRC errors, HARQ retransmissions, low SNRs, low signal levels, ...

Increase in required throughput, i.e. a higher amount of data to be transmitted is expected and therefore more MIMO streams and a higher robustness is required. This could be identified e.g. based on the following:

A new service type has become active, e.g. a video call on top of a voice call or a non-streaming service like data download or browsing.

The current MIMO streams are very loaded, e.g. the packet activity is larger than some threshold (like 50%) showing that the current available data rate is almost completely used.

A request for higher amount of data/high number of packets is transmitted in the uplink.

The packet counters between requested packets and received packets are diverging.

In good radio conditions the UE 105 may switch on one or more additional antennas to increase the number of MIMO streams and with that the throughput. However, that requires that the one or more additional antennas result in a higher rank in the channel estimation matrix. If this is not the case (which can happen) than the one or more additional antennas may have no benefit in good conditions. Thus, the UE 105 may check in regular intervals, e.g. every x frames (x being a predetermined number), what the possible rank would be with more (or all) antennas being active by switching some (or all) antennas on for a short measurement period, e.g. only long enough to get a reliable channel estimation matrix to compute the possible rank. During this short period the additional antennas may be used to improve demodulation. This rank measurement may for example also be triggered when a request for increased throughput is detected.

When the UE 105 has many receive antennas and only few are active, there may be several antennas to choose from if e.g. only one antenna shall be switched on. Thus, a mechanism which selects the best antenna according to some criterion may be used optimize the performance. Such a criterion could for example be one or a combination of the following The highest SNR after switching on the antenna(s)

The highest rank after switching on the antenna(s)

The antenna(s) is/are used/not used for transmission (see the above comments regarding the usage of antennas for both reception and transmission)

Some of these criteria actually require measurements for the antennas which are candidates as antenna(s) to be used. For this, the candidate antennas may be switched on to decide which one is (or which ones are) are in the end kept switched on. This may for example be done according to the following:

The UE 105 may use measurements during short measurement periods like for example mentioned above get e.g. SNR and/or rank measurements for the candidate antennas These may be regular antenna measurements like mentioned above (like every x frames) or an instantaneous antennas measurement when the UE 105 detects a request for more antennas (e.g. when the UE 105 has determined that one or more antennas should be switched on).

For a (regular or instantaneous) measurement it may be undesirable to switch on all antennas to avoid increasing the power consumption too much during the measurement. Thus, the UE 105 may select only one or a few candidate antennas for the measurement.

For example, for measurements in regular intervals candidate antennas for which measurements are made may be selected according to a round robin scheme across all candidate antennas (which may be all antennas that are not already switched on, i.e. already used as receive antennas).

For instantaneous as well as regular measurements the UE 105 may also use a priori information like about the (usual) correlation between the candidate antennas, e.g. information about which candidate antenna is usually uncorrelated to which other candidate or active antennas. With multiple candidate antennas some candidate antennas typically have more correlation to each other or the active antennas than to other candidate or active antennas. This may e.g. determined by measurements at production/calibration, by a history the UE 105 keeps over time, or simply by knowledge on the position of the antennas in the UE 105. This information may be stored in a lookup table, listing e.g. that when an antenna A is active, an antenna B should be preferred over an antenna C, because antenna B is most likely the better one (yielding higher rank, SNR, ... ). This table may then be used when the UE 105 decides whether antenna B or antenna C is to be measured (and how often) when antenna A is already active.

The UE 105 may simply take a decision e.g. based on the lookup table described above and then check if the antenna chosen for measurement yields the desired effect, e.g. a higher rank allowing for more MIMO streams.

It should be noted that in case the evaluation results (i.e. the evaluation of the effect of one or more antennas being switched on) indicate that this may be beneficial the UE 105 may also switch off other antennas (typically less antennas than being switched on) at the same time as switching the antennas on. For example, the UE 105 may have four antennas A, B, C, D and antennas A and B are active. Then the request for three antennas is detected because rank 3 is needed. Assuming that the measurements show that A, C, and D yield rank 3 with the highest SNR, the UE 105 may decide to switch off antennas B and switch on C and D at the same time (or after a short transition time where all four antennas are active).

An example for a scheme to switch off antennas is explained in the following with reference to FIG. 9.

Figure 9:
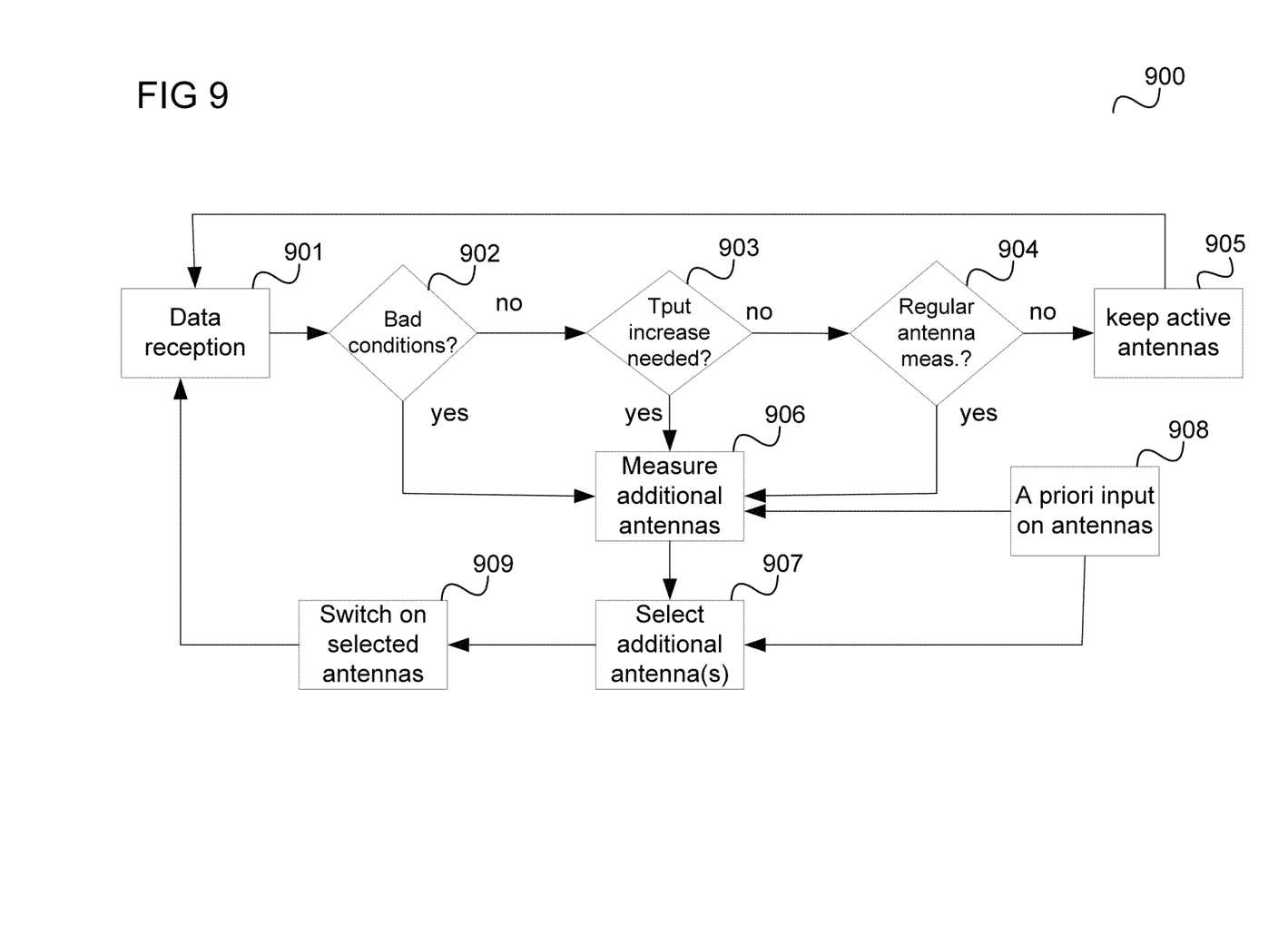
FIG. 9 shows a block diagram illustrating a scheme for adding receive antennas for MIMO data reception.

FIG. 9 shows a block diagram 900.

During data reception in 901, the UE 105 determines whether the conditions are bad in 902, e.g. whether radio conditions are not good enough such that, for example, a required service quality can be ensured using the current number of active antennas.

In case that the conditions are not bad the UE 105 determines in 903 whether an increase in data throughput is needed. If this is not the case, the UE 105 determines in 904 whether a regular antenna measurement is scheduled. If this is also not the case, the number of currently active antennas is kept the same in 905 and the UE 105 continues with the data reception in 901 using the same number of receive antennas.

If, however, any of the checks in 902, 903 or 904 is positive, the UE 105 performs a performance measurement for one or more additional antennas (i.e. antennas that are not currently switched on, i.e. currently used for the data reception).

Based on the result of the measurement, the UE 105 selects the antennas to be used for the further data reception. The UE 105 may use a priori input (i.e. a priori information) 908 about the antenna behavior (e.g. about antenna correlation as described above for 906 and 907. In 909, the UE 105 switches on the selected antennas (i.e. activates the selected antennas for data reception) and continues with the data reception in 901.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
   a plurality of receive antennas;
   a determiner configured to determine, for each receive antenna of the plurality of receive antennas, whether the receive antenna is to be used by the communication device for performing a MIMO data reception; and
   a receiver configured to perform the MIMO data reception using one or more receive antennas that have been determined to be used for performing the MIMO data reception;
   wherein the determiner is further configured to switch off one or more receive antennas that have been determined not to be used for performing the MIMO data reception,
   wherein the determiner is configured to determine, for each antenna of the plurality of antennas, a reception performance and is configured to determine whether the receive antenna is to be used by the communication device for performing a MIMO data reception based on a comparison of the reception performances determined for the receive antennas.

2. The communication device of claim 1, wherein the MIMO data reception is MIMO data reception from a sender of MIMO streams and the communication device further comprises a transmitter configured to transmit an indication of an amount of MIMO streams that should be transmitted by the sender to the communication device, wherein the indication indicates a number of MIMO streams that is equal to the amount of receive antennas that have been determined to be used for performing the MIMO data reception.

3. The communication device of claim 2, wherein the indication of the number of MIMO streams that should be transmitted by the sender to the communication device is an indication of the number of MIMO streams that can be successfully received by the communication device.

4. The communication device of claim 2, wherein the indication is a MIMO rank indicator.

5. The communication device of claim 1, wherein the determiner is configured to determine an amount indicating a number of receive antennas to be used by the communication device for performing the MIMO data reception and is configured to determine as many as the determined amount of the receive antennas to be used for performing the MIMO data reception.

6. The communication device of claim 1, wherein the determiner is configured to determine for each receive antenna of the plurality of receive antennas, whether the receive antenna is to be used by the communication device for performing a MIMO data reception based on a reception performance criterion.

7. The communication device of claim 6, wherein the determiner is configured to determine for each receive antenna of the plurality of receive antennas, whether the receive antenna is to be used by the communication device for performing a MIMO data reception such that the number of the receive antennas for which it determines that that they are to be used for performing the MIMO data reception is the number minimum of antennas to meet the reception performance criterion.

8. The communication device of claim 6, wherein the reception performance criterion is a required throughput of the MIMO data reception.

9. The communication device of claim 1, wherein the determiner is configured to determine, for each receive antenna of the plurality of receive antennas, whether the receive antenna is to be used by the communication device for performing a MIMO data reception based on whether the receive antenna is used by the communication device for sending data.

10. The communication device of claim 1, wherein the determiner is configured to determine, for each receive antenna of the plurality of receive antennas, whether the receive antenna is to be used by the communication device for performing a MIMO data reception based on the radio conditions between the communication device and a sender of the data to be received in the MIMO data reception.

11. The communication device of claim 1, wherein the determiner is configured to determine, for each receive antenna of the plurality of receive antennas, whether the receive antenna is to be used by the communication device for performing a MIMO data reception based on a correlation of the antenna with other antennas of the plurality of receive antennas.

12. The communication device of claim 1, wherein the determiner is configured to determine, for each receive antenna of the plurality of receive antennas, whether the receive antenna is to be used by the communication device for performing a MIMO data reception based on a reception quality of a previous MIMO data reception performed using at least a part of the plurality of receive antennas.

13. The communication device of claim 12, wherein the determiner is configured to determine, for each receive antenna of the plurality of receive antennas, whether the receive antenna is to be used by the communication device for performing a MIMO data reception such that an amount of receive antennas that have been determined to be used for performing the MIMO data reception is higher than an amount of receive antennas used for the previous MIMO data reception if the reception quality of the previous MIMO data reception is not sufficient for the MIMO data reception.

14. The communication device of claim 12, wherein the determiner is configured to determine, for each receive antenna of the plurality of receive antennas, whether the receive antenna is to be used by the communication device for performing a MIMO data reception such that an amount of receive antennas that have been determined to be used for performing the MIMO data reception is lower than an amount of receive antennas used for the previous MIMO data reception if the MIMO streams to be received in the MIMO data reception is lower than the number of receive antennas used in the previous MIMO data reception.

15. A method for receiving data comprising:
   determining, for each receive antenna of a plurality of receive antennas of a communication device, a reception performance for each antenna of the plurality of receive antennas and determining whether each the receive antenna is to be used by the communication device for performing a MIMO data reception based on a comparison of the reception performance determined for the receive antennas;

performing the MIMO data reception using one or more antennas that have been determined to be used for performing the MIMO data reception; and switching off one or more receive antennas that have been determined not to be used for performing the MIMO data reception.

16. The method of claim 15, wherein the MIMO data reception is MIMO data reception from a sender of MIMO streams and the method further comprises transmitting an indication of an amount of MIMO streams that should be transmitted by the sender to the communication device, wherein the indication indicates a number of MIMO streams that is equal to an amount of receive antennas that have been determined to be used for performing the MIMO data reception.

17. A communication device comprising:
a plurality of receive antennas;
a determiner configured to determine a type of a communication service used by the communication device and to determine, based on the type of the communication service, for each receive antenna of the plurality of receive antennas, whether the receive antenna is to be used by the communication device for performing a data reception; and
a receiver configured to perform the data reception using one or more receive antennas that have been determined to be used for performing the data reception; wherein the determiner is further configured to switch off one or more receive antennas that have been determined not to be used for performing the MIMO data reception,
wherein the determiner is configured to determine, for each antenna of the plurality of antennas a reception performance and is configured to determine whether the receive antenna is to be used by the communication device for performing a MIMO data reception based on a comparison of the reception performances determined for the receive antennas.

18. The communication device of claim 17, wherein the type of the communication service is a type of the transmission behavior of the communication service.

19. The communication device of claim 17, wherein the type of the communication service is whether the communication service requires periodic reception of data, real-time reception of data or burst reception of data.

20. The communication device of claim 17, wherein the type of the communication service is whether the communication service can be completed earlier if a higher data throughput is supported.

21. The communication device of claim 17, wherein the type of the communication service is a data throughput requirement of the communication service.

22. A method for receiving data comprising:
determining a type of a communication service used by a communication device;
determining, based on the type of the communication service, for each receive antenna of a plurality of receive antennas of the communication device, a reception performance for each antenna of the plurality of receive antennas and determining whether the receive antenna is to be used by the communication device for performing a data reception based on a comparison of the reception performance determined for the receive antennas; and
performing the data reception using one or more receive antennas that have been determined to be used for performing the data reception; and
switching off one or more receive antennas that have been determined not to be used for performing the MIMO data reception.

23. The method of claim 22, wherein the type of the communication service is a type of the transmission behavior of the communication service.

* * * * *

UNITED STATES PATENT AND TRADEMARK OFFICE
CERTIFICATE OF CORRECTION

| | | |
|---|---|---|
| PATENT NO. | : 8,873,665 B2 | Page 1 of 1 |
| APPLICATION NO. | : 13/682758 | |
| DATED | : October 28, 2014 | |
| INVENTOR(S) | : Thorsten Clevorn | |

It is certified that error appears in the above-identified patent and that said Letters Patent is hereby corrected as shown below:

In the Claims

Claim 15 - Column 16, line 67: delete "whether each the receive" and write --whether each receive-- in place thereof.

Claim 17 - Column 17, line 36: delete "antennas a reception" and write --antennas, a reception-- in place thereof.

Signed and Sealed this
Twenty-first Day of July, 2015

Michelle K. Lee
*Director of the United States Patent and Trademark Office*